Aug. 14, 1934.     C. E. BENNETT     1,969,722
CABLE SYSTEM FOR THE UNDERGROUND TRANSMISSION
OF HIGH TENSION ELECTRICAL ENERGY
Filed Dec. 28, 1932     2 Sheets-Sheet 1
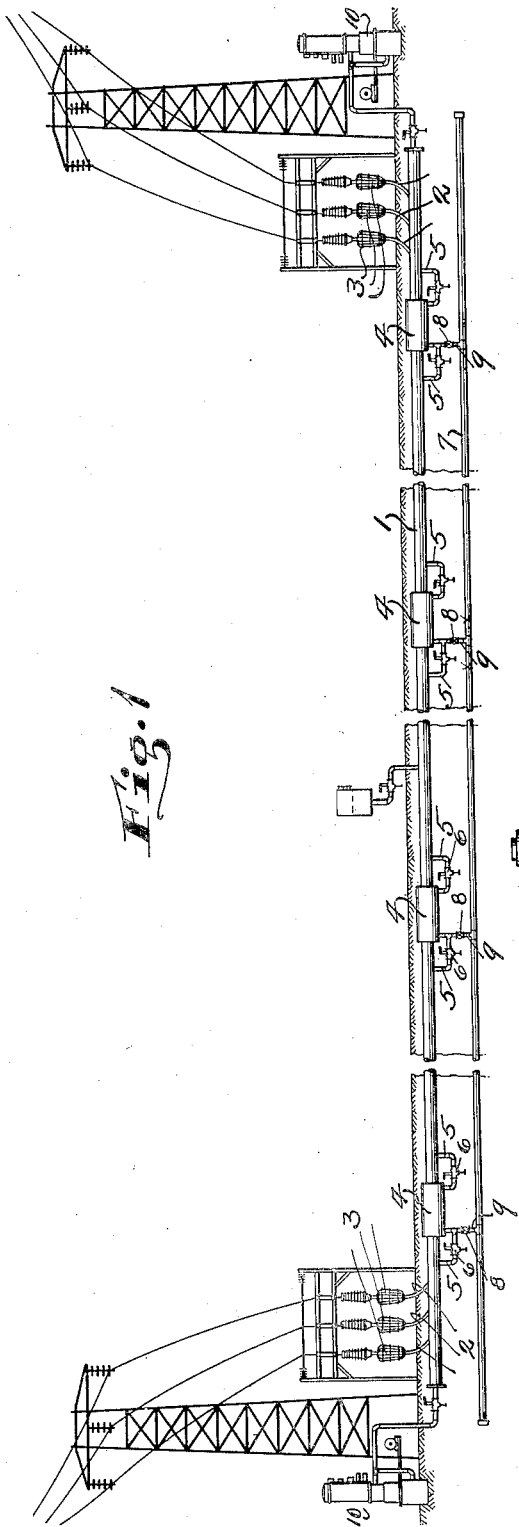
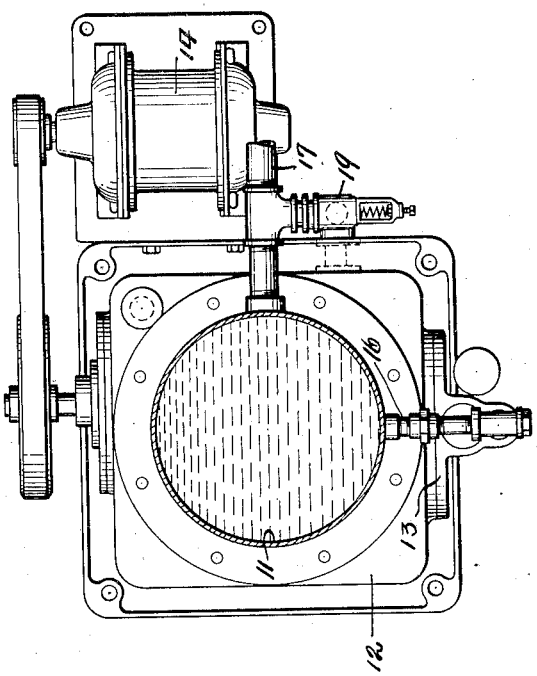
INVENTOR.
Charles E. Bennett
BY
Kiddle, Margeson and Hornidge
ATTORNEYS.

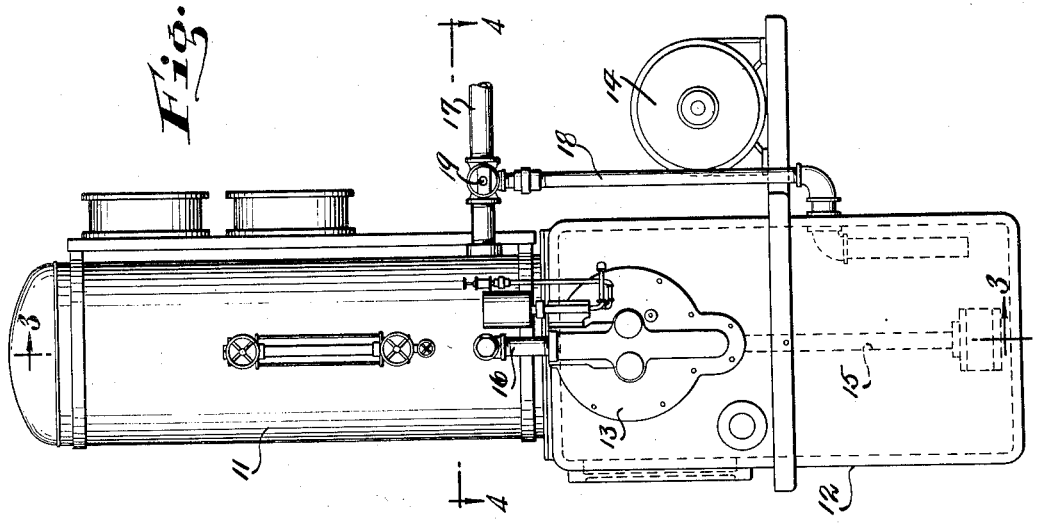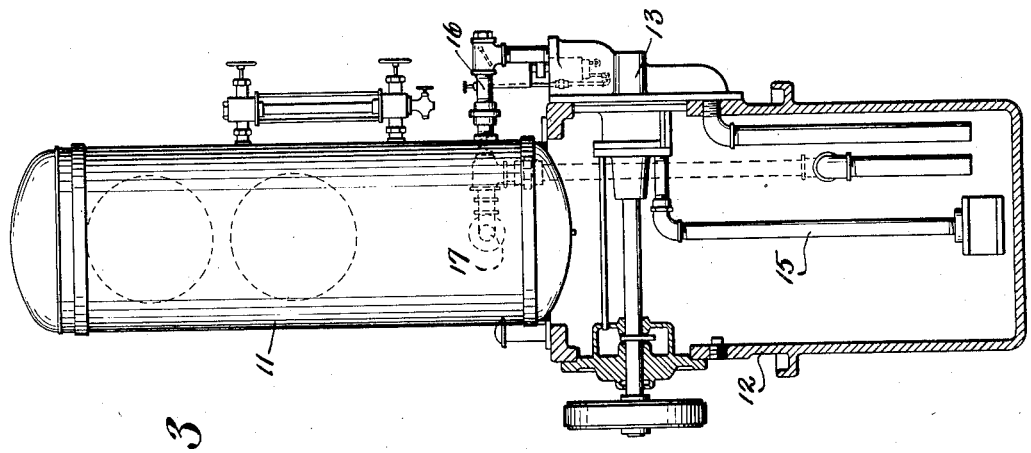

Patented Aug. 14, 1934

1,969,722

UNITED STATES PATENT OFFICE

1,969,722

CABLE SYSTEM FOR THE UNDERGROUND TRANSMISSION OF HIGH TENSION ELECTRICAL ENERGY

Charles E. Bennett, Hawthorne, N. J., assignor to The Okonite-Callender Cable Company, Incorporated, Paterson, N. J., a corporation of New Jersey Application December 28, 1932, Serial No. 649,131

2 Claims. (Cl. 247—1)

This invention is directed to an electric cable system for the transmission of power and while adapted for use in connection with various types of oil filled electric cables it is particularly adaptable for use in connection with a cable system such as disclosed in my copending application Serial No. 553,714, wherein the system is maintained filled with oil under high pressure as, for example, five atmospheres or more.

In my copending application Serial No. 631,441 filed September 2, 1932, I have disclosed a system employing a pump for maintaining the system filled with oil while in my copending application Serial No. 648,181 filed December 21, 1932, I have disclosed a system wherein the oil is maintained under pressure by means of gas pressure tanks.

The present invention provides a system employing pumps and gas and the system is full automatic in operation.

In the drawings accompanying this application:

Fig. 1 is a diagrammatic view of my improved system;

Fig. 2 is a view in elevation of the pump;

Fig. 3 is a part section on the line 3—3 of Fig. 2; and

Fig. 4 is a section on the line 4—4 of Fig. 2.

Referring to the drawings in detail, my improved cable system comprises a pipe 1 into which the insulated unsheathed conductors of the cable are drawn, these conductors passing out of the pipe through manifold outlet pipes 2 at each end of the system and being terminated at terminals 3.

The pipe 1 is equipped at intervals with semi-stop joints 4 the number of course depending upon the particular installation. At each end of each of the semi-stop joints 4 is a pipe 5 which communicates with the interior of the semi-stop joint and with the interior of the pipe 1 and is equipped with an automatic shut-off valve 6. The purpose of this arrangement is to provide for isolating any section of the pipe 1 that may rupture or become leaky when the cable is in operation, the pipe 1 to be filled with oil under pressure as will be hereinafter pointed out. Inasmuch as this construction constitutes the subject matter of my copending application Serial No. 631,441, filed September 2, 1932, the same will not be described in any further detail.

Paralleling the pipe 1 is a drain pipe 7 connected to one of the pipes 5 at each joint 4 by a pipe 9 equipped with shut-off valves 8. This permits of draining of any part of the system when necessary.

In order that the pipe 1 may be kept filled with oil or other fluid insulating medium under pressure I provide a pressure apparatus 10 at each end of the system. This apparatus comprises a supply tank 11 and a storage tank 12. The supply tank 11 contains oil in the lower part thereof and gas in the upper part such as nitrogen, for instance, or other inert gas. The storage tank 12 is equipped with a pump 13 driven by an electric motor 14. This pump is provided with intake pipe 15 extending downwardly in the storage tank to a point near the bottom thereof, the pump, when in operation, drawing oil from the tank 12 and discharging it by way of pipe 16 into the supply tank 11. Oil under pressure is discharged from the supply tank 11 into the cable pipe 1 through a discharge pipe 17 when sufficient pressure, five atmospheres for example, has been built up in the supply tank. The pipe 17 is equipped with a relief pipe 18 leading therefrom down into the storage tank 12 and provided with a pressure relief valve 19.

The apparatus just described is adapted to be automatically controlled so that when sufficient oil has been pumped into the supply tank 11 to build up the desired pressure therein say, for example, a minimum pressure of five atmospheres, the pump 13 will automatically shut off. It will be appreciated also that on any fall in pressure the pump will automatically start up. Inasmuch as this pressure apparatus is a commercial article known as motor driven pump and tank with storage reservoir used for governor control on hydraulic turbines further description thereof will not be given.

As above mentioned the pipe 17 is connected to the cable pipe 1 and assuming that the apparatus is set for maintaining a pressure of five atmospheres on the oil or other fluid insulating material used in the pipe 1, it will be understood that when the pressure in the supply tank 11 reaches this point the circuit of the motor 14 will be opened automatically and the pump 13 will stop. In order that excessive pressure may not be built up in the pipe 1 when the cable enclosed therein is loaded, I have provided the relief valve 19 above referred to, this valve opening on excessive pressure in the system, due to heating for example, to permit of a flow back from the cable to the storage tank 12.

From the foregoing, therefore, it will be seen that I have provided a cable system in which the insulated conductors of the cable are enclosed in a tubular casing, for example, kept filled with oil or other insulating fluid under pressure, the pressure being established and maintained through the instrumentality of the apparatus which as above mentioned is full automatic in operation and provides not only for maintaining the desired pressure in the casing 1 but also by the provision of the relief valve 19 above referred to for relieving the pressure in the casing when the same builds up beyond a predetermined point.

I wish it to be understood that changes may be made in the details of construction above described within the purview of my invention.

What I claim is:—

1. An electric cable system comprising in combination a pipe enclosing the insulated conductors of the cable, a supply tank and a storage tank, the supply tank containing oil in the lower part thereof and a gas in the upper part, a pump for drawing oil from the storage tank and delivering it to the supply tank to build up a minimum pressure therein of substantially five atmospheres, the supply tank delivering oil under this pressure to the said pipe to maintain the same filled with oil at the aforementioned pressure, and a valve-controlled relief pipe in communication with said storage tank whereby excessive pressure in the pipe of the system will lift the valve of said valve controlled relief pipe to permit oil to flow out of the system into said storage tank thereby to reduce the pressure in the pipe to the desired degree.

2. An electric cable system comprising in combination a tubular casing enclosing the insulated conductors of the cable, a supply tank and a storage tank at each end of the system, each of said supply tanks being in communication with said casing, a pressure controlled pump for drawing oil from said storage tank and delivering it to the supply tank, gas in the supply tank above the oil whereby a pressure is built up in the supply tank and oil is forced therefrom into the casing of the system to maintain the casing filled with oil under pressure, a relief pipe communicating with the casing of the system and with said storage tank, a pressure relief valve controlling said relief pipe so that upon an increase in pressure in the casing of the cable beyond a predetermined point oil will be forced out of the casing back into said storage tank.

CHARLES E. BENNETT.